US009573503B2

(12) United States Patent
Nie et al.

(10) Patent No.: US 9,573,503 B2
(45) Date of Patent: Feb. 21, 2017

(54) VEHICLE SEAT

(71) Applicant: TOYOTA BOSHOKU KABUSHIKI KAISHA, Aichi-ken (JP)

(72) Inventors: Tadashi Nie, Nagoya (JP); Hisatomo Asano, Toyota (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 3 days.

(21) Appl. No.: 14/715,030

(22) Filed: May 18, 2015

(65) Prior Publication Data
US 2015/0336490 A1 Nov. 26, 2015

(30) Foreign Application Priority Data
May 20, 2014 (JP) .................................. 2014-104122

(51) Int. Cl.
*A47C 7/02* (2006.01)
*B60N 2/64* (2006.01)
*B60N 2/68* (2006.01)
*B60N 2/44* (2006.01)
*B60N 2/58* (2006.01)

(52) U.S. Cl.
CPC .............. *B60N 2/646* (2013.01); *B60N 2/449* (2013.01); *B60N 2/64* (2013.01); *B60N 2/68* (2013.01); *B60N 2/58* (2013.01); *B60N 2/5816* (2013.01); *B60N 2/5883* (2013.01); *B60N 2/686* (2013.01)

(58) Field of Classification Search
CPC ........... B60N 2/68; B60N 2/686; B60N 2/646; B60N 2/64; B60N 2/58; B60N 2/5816; B60N 2/5883

USPC ............ 297/452.13, 452.12, 452.18, 452.21, 297/452.48, 452.51, 452.56, 452.61
See application file for complete search history.

(56) References Cited

U.S. PATENT DOCUMENTS

| 4,834,458 | A | * | 5/1989 | Izumida | ................... | A47C 7/18 |
| | | | | | | 297/452.23 |
| 4,973,105 | A | * | 11/1990 | Itou | ........................ | B60N 2/161 |
| | | | | | | 297/218.1 |
| 5,607,201 | A | * | 3/1997 | Irie | .......................... | A47C 7/24 |
| | | | | | | 297/452.62 |
| 6,357,789 | B1 | * | 3/2002 | Harada | .................. | B60R 21/207 |
| | | | | | | 280/728.3 |
| 2002/0063452 | A1 | * | 5/2002 | Harada | ................ | B60N 2/5825 |
| | | | | | | 297/216.13 |

(Continued)

FOREIGN PATENT DOCUMENTS

JP 2010-029276 2/2010

*Primary Examiner* — Chi Q Nguyen
(74) *Attorney, Agent, or Firm* — Greenblum & Bernstein, P.L.C.

(57) ABSTRACT

A seat pad includes a main portion and a bank portion. When the seat pad is disposed on a seat frame, a reverse face side of the bank portion contacts the seat frame to be supported. When the bank portion is pressed in a seat width direction, the bank portion is flexurally deformed so as to be crushed around a contact portion contacting the seat frame. A contact member is relatively movably provided on a side of the backing material that faces the seat frame, and the seat pad is disposed on the seat frame while the contact member is pressed against the seat frame. When the bank portion is pressed in the seat width direction, the backing material and the seat pad including the bank portion move in a crushing direction relatively to a portion of the contact member that contacts the seat frame.

5 Claims, 6 Drawing Sheets

(56) References Cited

U.S. PATENT DOCUMENTS

| | | | |
|---|---|---|---|
| 2005/0225128 A1* | 10/2005 | Diemer | B60N 2/002 297/180.12 |
| 2010/0109390 A1* | 5/2010 | Nishimura | B60N 2/5685 297/180.12 |
| 2010/0181796 A1* | 7/2010 | Galbreath | B60N 2/72 296/63 |
| 2011/0278902 A1* | 11/2011 | Galbreath | B60N 2/70 297/452.48 |
| 2013/0300178 A1* | 11/2013 | Murata | B60N 2/646 297/452.18 |
| 2014/0292043 A1* | 10/2014 | Nii | B60N 2/68 297/180.1 |
| 2015/0246627 A1* | 9/2015 | Shimizu | B60N 2/66 297/216.14 |
| 2015/0321589 A1* | 11/2015 | Takei | B60N 2/6009 297/452.18 |

* cited by examiner

VEHICLE SEAT

INCORPORATION BY REFERENCE

The disclosure of Japanese Patent Application No. 2014-104122 filed on May 20, 2014 including the specification, drawings and abstract is incorporated herein by reference in its entirety.

BACKGROUND OF THE INVENTION

1. Field of the Invention

The invention relates to a vehicle seat including a seat frame that constitutes a frame of the seat, and a seat pad (a member that elastically supports an occupant) that is supported by the seat frame.

2. Description of Related Art

As this kind of vehicle seat, there is disclosed a vehicle seat that includes a seat cushion, and a seat back connected to the seat cushion so as to extend upward (Japanese Patent Application Publication No. 2010-29276 (JP 2010-29276 A)). In the aforementioned art, each of the seat cushion and the seat back includes a seat frame that constitutes a frame of the seat, and a seat pad that forms an outer shape of the seat. The seat frame is a substantially rectangular frame body (which is typically made of a metal). The seat pad is a substantially rectangular member that elastically supports an occupant (and that is typically made of a foamed resin), and a reverse face side of the seat pad is covered with a backing material such as a non-woven fabric. A center portion of the seat pad (on a seating side) is flat (a main portion is formed), and end portion sides of the seat pad in a seat width direction protrude toward the seating side as compared to the center portion of the seat pad (bank portions are formed). In the aforementioned art, when the seat pad is disposed on the seat frame, the main portion is disposed in the seat frame, and a reverse face side of each bank portion contacts the seat frame so as to be supported by the seat frame. In this manner, the reverse face side of each bank portion of the seat pad is hooked on the seat frame.

In the aforementioned seat configuration, for example, when the occupant gets on/off a vehicle, the bank portion of the seat back may be pressed inward from outside the seat due to its contact with the occupant. In this case, in the aforementioned art, the reverse face side of the bank portion contacts the seat frame and is hooked on the seat frame. Therefore, an end portion side of the seat pad that constitutes the bank portion (an end portion side that protrudes toward the seating side) is (excessively) flexurally deformed so as to be crushed (bent) toward an inner side of the seat around a contact portion that contacts the seat frame. Thus, in the configuration of the known art, every time the occupant gets on/off the vehicle, the end portion side of the bank portion (a specific portion) may be damaged through repeated flexural deformation or the like.

SUMMARY OF THE INVENTION

The invention provides a vehicle seat that makes it possible to appropriately avoid a situation where only a specific portion of a bank portion is flexurally deformed excessively.

A vehicle seat according to an aspect of the invention includes a seat frame that constitutes a frame of the vehicle seat, a seat pad that forms an outer shape of the vehicle seat and that elastically supports an occupant, and a planar backing material that is integrated with the seat pad and that covers a reverse face of the seat pad. The seat pad includes a main portion that allows the occupant to be seated, and a bank portion that is disposed at an outer side of the vehicle seat with respect to the main portion, and that protrudes toward a seating side. When the seat pad is disposed on the seat frame, the main portion is disposed in the seat frame, and a reverse face side of the bank portion contacts the seat frame so as to be supported by the seat frame. When the bank portion is pressed in a width direction of the vehicle seat, an end portion side of the seat pad that constitutes the bank portion is flexurally deformed so as to be crushed around a contact portion that contacts the seat frame. In this seat configuration, it is desirable to avoid a situation where only a specific portion of the bank portion is flexurally deformed excessively.

Thus, the vehicle seat according to the aspect of the invention includes a planar contact member that is harder than the backing material. The contact member is provided on a side of the backing material that faces the seat frame such that the contact member is movable relatively to the backing material, and the seat pad is disposed on the seat frame while the contact member is pressed against the seat frame. When the bank portion is pressed in the width direction of the vehicle seat, the backing material and the seat pad including the bank portion move in a crushing direction relatively to a portion of the contact member that contacts the seat frame. In the aspect of the invention, the backing material and the seat pad including the bank portion move as a whole relatively in the crushing direction. Therefore, it is possible to appropriately avoid the situation where only a specific portion of the bank portion is flexurally deformed excessively.

According to the aspect of the invention, it is possible to appropriately avoid the situation where only a specific portion of the bank portion is flexurally deformed excessively.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

Figure 1:
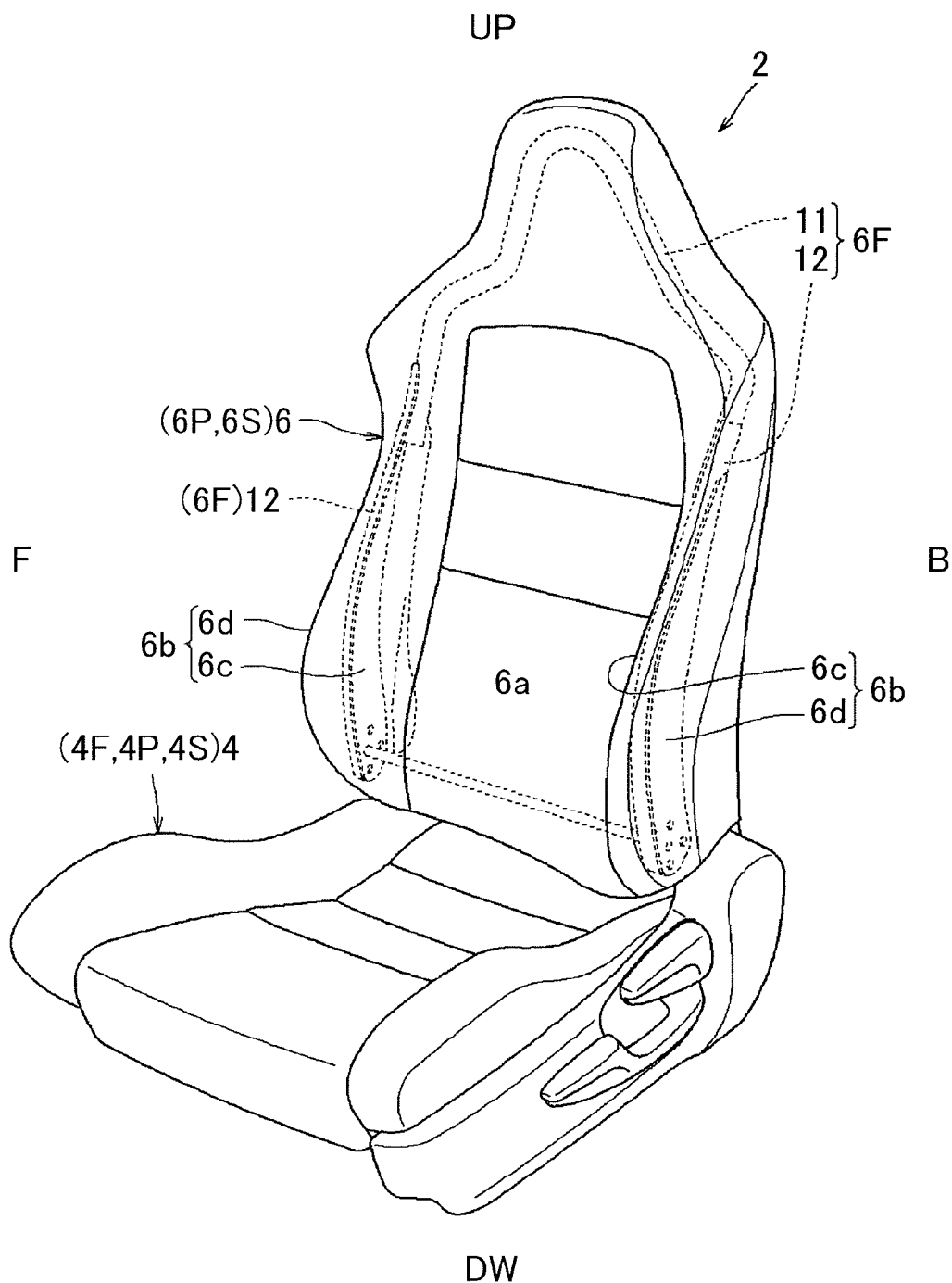
FIG. 1 is a perspective view of a vehicle seat.

An embodiment of the invention will be described hereinafter with reference to FIGS. 1 to 7. In each of drawings, where appropriate, a space in front of a vehicle seat is denoted by a reference symbol F, a space behind the vehicle seat is denoted by a reference symbol B, a space above the vehicle seat is denoted by a reference symbol UP, and a space below the vehicle seat is denoted by a reference symbol DW. A vehicle seat 2 of FIG. 1 includes a seat cushion 4 and a seat back 6. These seat constituent members include seat frames (4F, 6F) that constitute a frame of the seat, seat pads (4P, 6P) that form an outer shape of the seat, and seat covers (4S, 6S) that cover the seat pads. The seat back 6 (which will be described later in detail) is tiltably coupled to a rear portion of the seat cushion 4, and a center portion of an upper portion of the seat back 6 (in an erected state) protrudes upward as compared to lateral portions of the upper portion of the seat back 6 (in other words, a headrest is formed).

The seat back 6 is a substantially rectangular member in a front view, and has a basic configuration (6F, 6P, 6S), a related configuration (a backing material 20 and a contact member 30), and a backboard 6B (the members will be described later in detail with reference to FIGS. 1 to 3). The seat back 6 of the embodiment of the invention includes a substantially flat center portion (i.e., a main portion 6a that will be described later) that allows an occupant to be seated. Both sides of the seat back 6 in a seat width direction (bank portions 6b that will be described later) protrude toward a seating side as compared to the center portion of the seat back 6. In the embodiment, for example, when the occupant gets on/off a vehicle, one of the bank portions 6b may be pressed inward from outside the seat due to contact between the bank portion 6b and the occupant. At this time, an end portion side of the seat pad 6P that constitutes the bank portion 6b (an end portion side that protrudes toward the seating side) is flexurally deformed so as to be crushed (bent) toward an inner side of the seat, and thus, a specific portion (X) of the bank portion 6b may be damaged (see FIG. 3). Thus, in the embodiment, by employing a configuration that will be described later, it is appropriately possible to avoid a situation where only the specific portion (X) of the bank portion 6b is flexurally deformed excessively. The configuration of each portion will be described hereinafter in detail.

Figure 3:
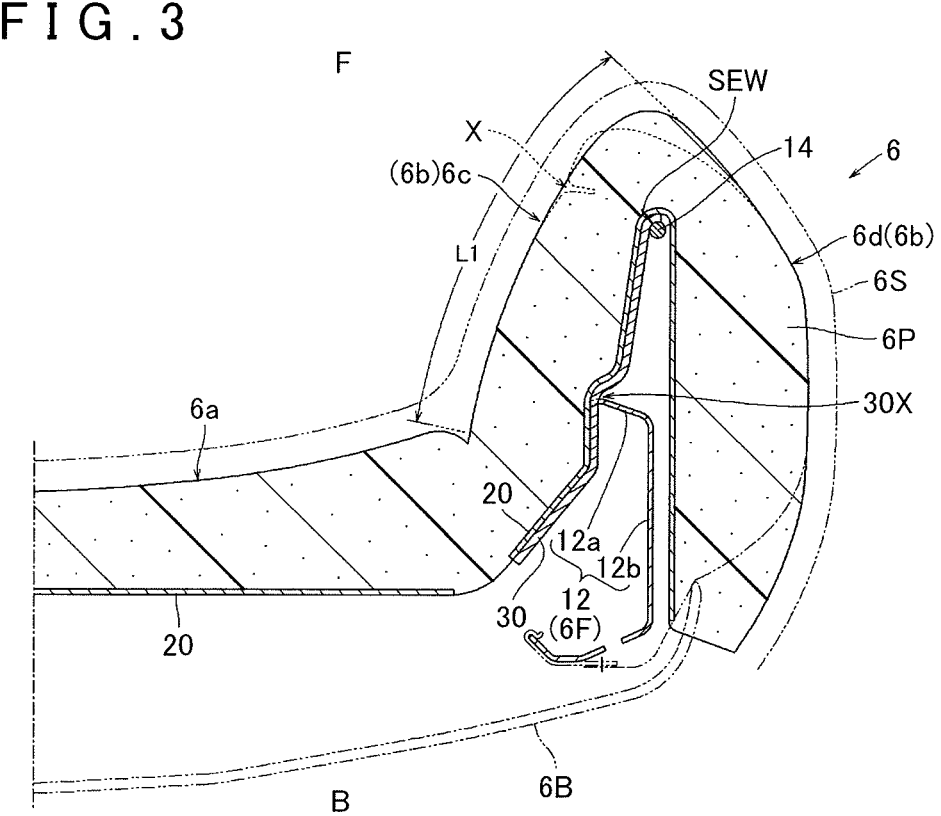
FIG. 3 is a cross-sectional view of a part of a seat back.

The seat cover 6S is a planar member that can cover the seat pad 6P, and can be formed of a fabric (a woven fabric, a knitted fabric, or a non-woven fabric) or a leather (a natural leather or an artificial leather) (see FIGS. 1 and 3). In the embodiment, the seat cover 6S can be integrated with the seating side of the seat pad 6P as will be described later. A planar urethane laminate (a member that is softer than the seat pad) can be appropriately attached to a reverse face side of the seat cover 6S.

The seat frame 6F is a frame body that has a substantially rectangular shape in a front view, and can be formed by a material with high rigidity (a metal, a hard resin or the like) (see FIGS. 1 and 3). The seat frame 6F of the embodiment of the invention includes an upper frame 11 that constitutes an upper frame portion (a pipe member that has a substantially inverse U-shape), a pair of side frames 12 that constitutes lateral frame portions, and a support member 14. The side frames 12 are flat plate members respectively, and are disposed at lateral portions of the seat such that the side frames 12 face each other. Each of the side frames 12 of the embodiment of the invention has a substantially transverse U-shape (in a cross-sectional view), and has a support portion 12a and a frame body portion 12b (see FIG. 3). The support portion 12a is a flat plate portion that is obtained by bending the seating side of each of the side frames 12 toward an inner side of the seat, and can contact a reverse face of a corresponding one of the bank portions 6b (bolsters 6c) that will be described later. The frame body portion 12b is a flat plate portion that extends from the support portion 12a toward a rear side of the seat. In the frame body portion 12b of the embodiment of the invention (in a cross-sectional view), a portion that constitutes a lateral portion of the seat has a straight line shape, and a seat rear portion side bends toward the inner side of the seat. The support member 14 is a rod member (a wire member) that is located at a position closer to the seating side than a corresponding one of the side frames 12 is, and that extends in an up-down direction of the seat. The support member 14 is disposed on the reverse face side of a corresponding one of the bank portions 6b (a location between the bolster 6c and an outer portion 6d) that will be described later. An end portion of the support member 14 can be appropriately fixed to the upper frame 11 or the side frame 12.

Figure 2:
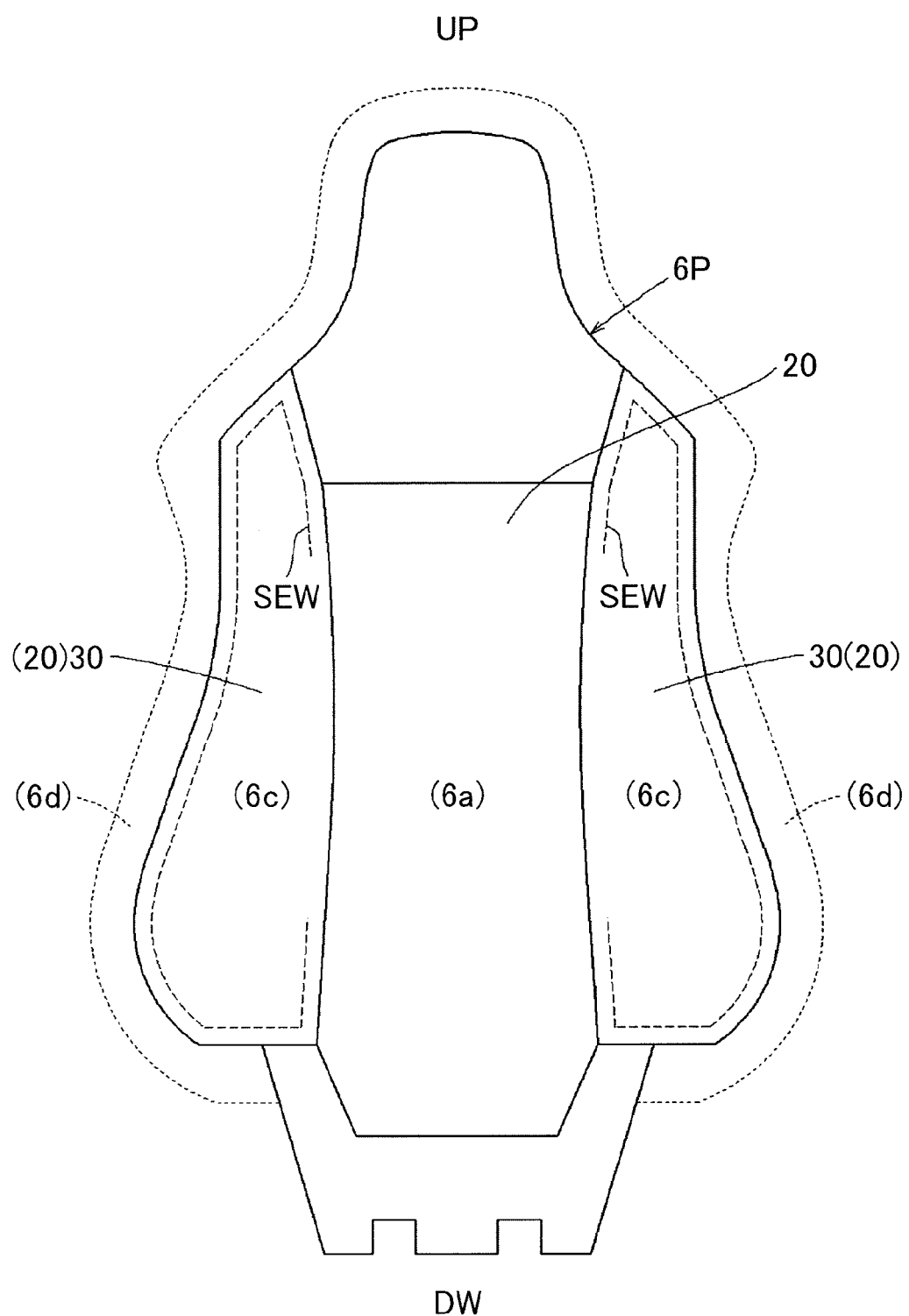
FIG. 2 is a rear view of a part of a seat pad.

The seat pad 6P is a member that forms an outer shape of the seat, and can be formed using an elastically expandable/contractable resin as a material (see FIGS. 2 and 3). As this kind of resin, a foamed resin such as polyurethane foam (with a density of 10 kg/m$^3$ to 60 kg/m$^3$) can be exemplified. The seat pad 6P of the embodiment has a substantially rectangular shape (in a front view), and includes the main portion 6a and the bank portions 6b. The main portion 6a is a (substantially flat) central portion of the seat pad 6P, and allows the occupant to be seated during normal running or the like. The bank portions 6b are portions that are disposed at outer sides with respect to the main portion 6a, and protrude toward the seating side. The bank portions 6b can support lateral parts of the occupant during cornering or the like. Each of the bank portions 6b of the embodiment of the invention has a substantially inverse V-shape (in a cross-sectional view), and can be divided into the bolster 6c (an inner portion in the seat) and the outer portion 6d (an outer portion in the seat). As will be described later, each of the bank portions 6b can be disposed so as to cover a corresponding one of the side frames 12 (the support portion 12a and an outer face of the frame body portion 12b) (see FIG. 3).

In the embodiment, the backing material 20 and the contact member 30 can be attached to a reverse face of the seat pad 6P (at an appropriate location) (see FIGS. 2 and 3). The backing material 20 is a planar material that is attached to the reverse face of the seat pad 6P (at least the bank portions 6b), and can be formed of, for example, felt, fabric, or leather. The contact member 30 is a planar member that is harder (less likely to deform) than the backing material 20. The contact member 30 can be attached to a part of the backing material 20 of each of the bank portions 6b (i.e., a part on a side that faces the support portion 12a) such that the contact member 30 faces the backing material 20. As the contact member 30 (as a material of the contact member 30), a planar material (a material exemplified as the backing material, a resin, or the like) that is harder than the backing material 20 can be used. In the case where the contact member 30 and the backing material 20 are formed of the same planar material, the contact member 30 may be made thicker and harder than the backing material 20. For example, a needle punch-type non-woven fabric (made of polypropylene) is used as the contact member 30 and the backing material 20. In this case, the contact member 30 can be made thicker than (e.g., twice to three times as thick as) the backing material 20, for example, by appropriately changing the weight per unit area of the contact member 30.

In the embodiment, the seat pad 6P is foam-molded in a cavity of a forming die (not shown) (see FIG. 3). In this case, the seat cover 6S and the backing material 20 can be integrated with the seat pad 6P simultaneously with the forming of the seat pad 6P. For example, the seat cover 6S is attached in advance to one inner face of the forming die that has the cavity (i.e., a part of the forming die, which forms the seating side). In this state, a forming material is placed into the cavity to form the seat pad 6P, and thus, the seat cover 6S is impregnated with the forming material. As a result, the seat cover 6S can be integrated with the seating side of the seat pad 6P.

In the embodiment, at the time of the aforementioned forming, the backing material 20 (the contact member 30) is disposed in advance on the other inner face of the forming die that has the cavity (a part of the forming die, which forms a reverse side) (see FIG. 3). In the embodiment, the backing material 20 is disposed on the reverse face side of the outer portion 6d. The backing material 20 and the contact member 30 are disposed on the reverse face side of the bolster 6c (a location that faces the support portion 12a when the seat pad 6P is disposed). While the backing material 20 and the contact member 30 are overlapped with each other, an edge portion of the contact member 30 (an edge portion that is disposed at an upper position when the contact member 30 is disposed) is sewn to the backing material 20 (a sewing line SEW, see FIGS. 2 and 3). At this time, the contact member 30 and the backing material 20 can be made appropriately movable relatively to each other by providing a suitable clearance therebetween (such a clearance that the contact member droops with respect to the backing material when they are lifted). The backing material 20 is impregnated with the forming material by forming the seat pad 6P as described above. Thus, the backing material 20 (the contact member 30) can be integrated with the reverse face of the seat pad 6P. At this time, in the embodiment, the contact member 30 can be disposed to be movable relatively to the backing material 20 for example, by appropriately adjusting the thickness dimension of the backing material 20 such that the impregnation with the forming material is stopped in the backing material 20. In the embodiment, only the backing material 20 can be integrated with the reverse face side of the main portion 6a (in a state in which the backing material 20 is spaced apart from the backing materials of the bank portions).

Referring to FIG. 3, the seat pad 6P is disposed on the seat frame 6F to form the seat back 6. In the embodiment, the main portion 6a is disposed in the seat frame 6F, and the reverse face side of each of the bank portions 6b contacts the seat frame 6F (the end portion side of the support portion 12a) so as to be supported by the seat frame 6F. At this time, in the embodiment, each of the bank portions 6b is placed on the support member 14 and the support portion 12a while being bent in a substantially V-shape (while being protruded toward the seating side). Then, the contact member 30 on the reverse face of each of the bank portions 6b (the bolsters 6c) is brought into contact with the end portion side of the support portion 12a and is hooked on the end portion side of the support portion 12a. At this time, the contact member 30 is hooked while being bent (curved) toward the seat pad 6P side at a portion (a contact portion 30X) that contacts the support portion 12a (the seat frame). Thus, the support portion 12a is received by the hard contact member 30 such that the support portion 12a can be appropriately restrained from engaging with the backing material 20. Then, the outer side of the bank portion 6b (the outer portion 6d) is disposed so as to cover the outer sides of the support portion 12a and the frame body portion 12b. Finally, the rear side of the seat back 6 is covered with the backboard 6B in the form of a board (which is typically made of resin). The backboard 6B can be fixed to the seat frame 6F or the like while end portions of the backboard 6B in the seat width direction are engaged with the seat pad 6P. A peripheral edge (a rear end) of the seat cover 6S that protrudes from the seat pad 6P can be engaged with the seat frame 6F via a hook member (no reference symbol is assigned to the hook member).

Figure 4:
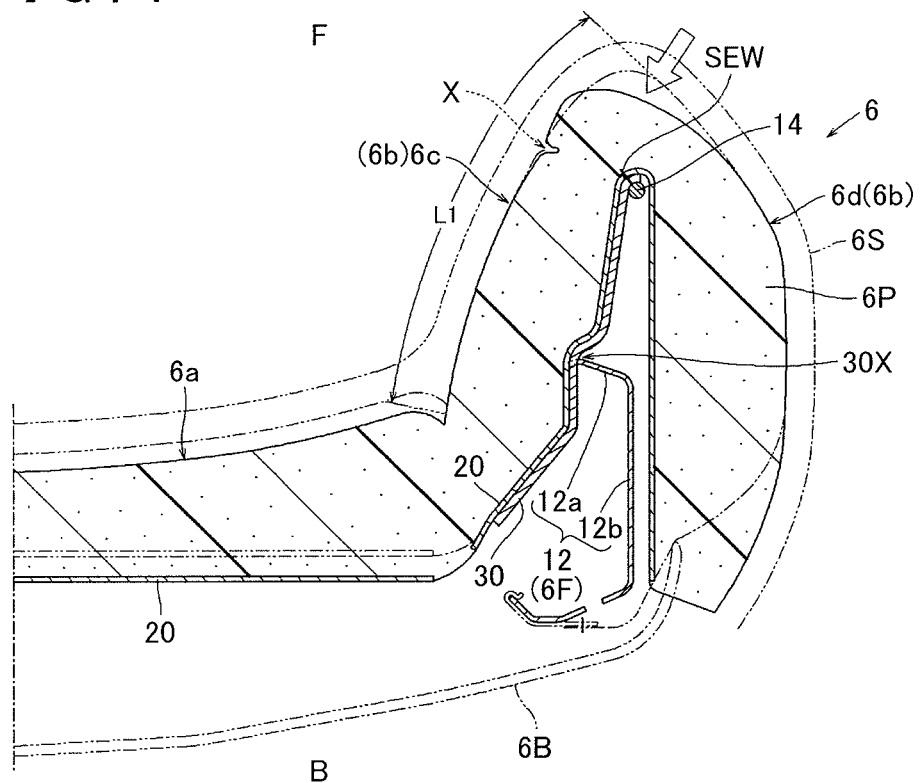
FIG. 4 is a cross-sectional view of a part of the seat back during flexural deformation.
Figure 5:
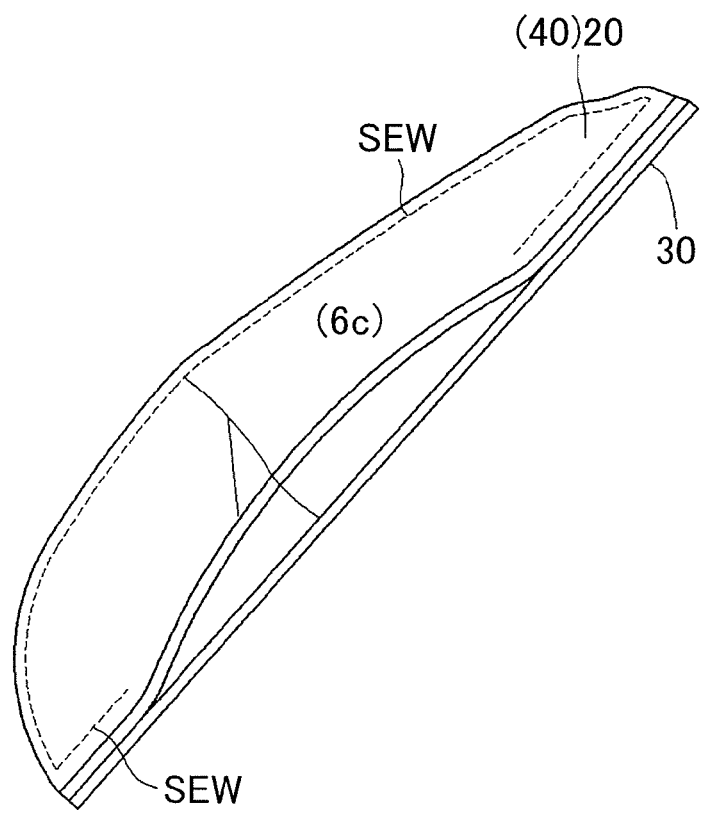
FIG. 5 is a perspective view of a backing material and a contact member according to a modified example.
Figure 6:
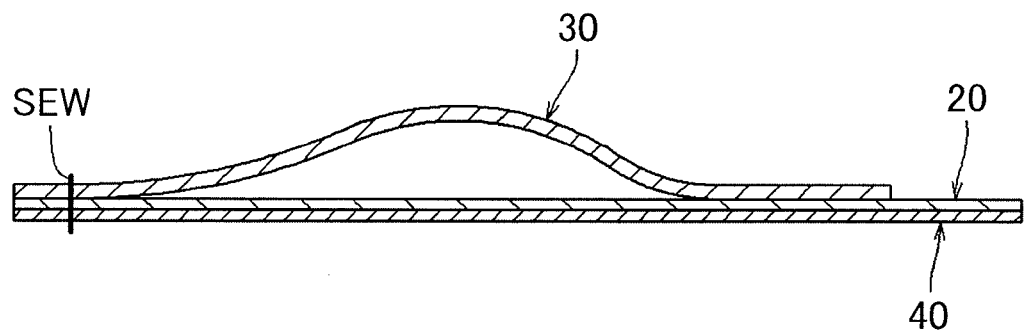
FIG. 6 is a cross-sectional view of the backing material and the contact member according to the modified example.
Figure 7:
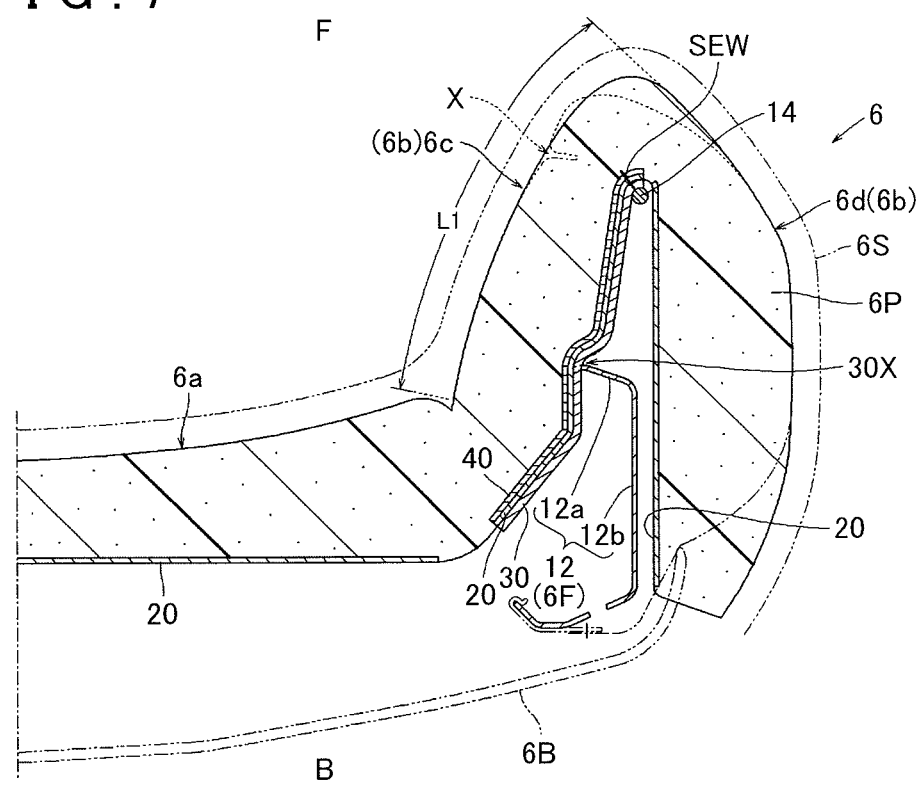
FIG. 7 is a cross-sectional view of a part of a seat back according to the modified example.

In this seat configuration, due to the occupant's action of getting on/off the vehicle, one of the bank portions 6b may be pressed from outside the seat (see FIGS. 3 and 4). At this time, the end portion side of the seat pad 6P that constitutes the bank portion 6b (which will be referred to as the specific portion X) is about to be flexurally deformed (is flexurally deformed) so as to be crushed (bent) toward the inner side around the portion of the contact member 30 that contacts the seat frame 6F (the contact portion 30X). In the embodiment (i.e., in the configuration in which the seat pad and the seat cover are integrated with each other) in particular, when the seat cover 6S is pressed together with the bank portion 6b, the seat cover 6S bends at the bolster 6c side. The bending amount of the seat cover 6S is equal to or larger than a length L1 of the bolster 6c. Therefore, the seat cover 6S may excessively bend at the specific portion X, and may crush the seat pad 6P inward at the specific portion X. The seat cover 6S tends to bend, and may continue flexing movements at the specific portion X. Therefore, the peripheral lengths of the seat cover 6S (the urethane laminate) and the seat pad 6P may exceed permissible values respectively, and thus, the materials of the seat cover 6S and the seat pad 6P may be broken (the seat cover 6S and the seat pad 6P may become rugged).

Thus, in the embodiment, the contact member 30 (a planar material that is harder and less likely to deform than the backing material 20) is provided on the reverse face side of each of the bank portions 6b such that the contact member 30 is movable relatively to the backing material 20. As described above, the seat pad 6P is disposed on the seat frame 6F while the contact member 30 contacts the seat frame 6F (the support portion 12a). In the embodiment, when the occupant gets on/off the vehicle, the bank portion 6b is pressed as described above, and therefore, the specific portion X of the bank portion 6b is about to be flexurally deformed so as to be crushed (bent). At this time, the seat pad 6P pressed by the occupant and the backing material 20 move downward (downward in FIG. 3 and FIG. 4, i.e., in a crushing direction) relatively to the contact portion 30X of the contact member 30 that contacts the support portion 12a. Thus, the seat pad 6P moves in the crushing direction as a whole, and therefore, the specific portion X can be appropriately prevented from being excessively crushed (bent). In the embodiment in particular, the bending amount of the seat cover 6S at the bolster 6c is reduced, and therefore, the seat cover 6S can be prevented from excessively bending at the specific portion X. Thus, in the embodiment, the materials of the seat cover 6S and the seat pad 6P can be prevented from being broken, and sitting comfort of the seat can be appropriately maintained.

As described above, in the embodiment, when one of the bank portions 6b is pressed, the seat pad 6P and the backing material 20 move as a whole in the crushing direction relatively to the seat frame 6F. Therefore, in the embodiment, it is possible to reduce the amount of flexural deformation of the specific portion X of each of the bank portions 6b, and to appropriately avoid a situation where only the specific portion X is flexurally deformed excessively.

As the method of attaching the contact member 30 to the seat pad 6P, it is possible to employ various methods in addition to the aforementioned method. For example, in a modified example, after the seat pad 6P is formed, the contact member 30 and the backing material 20 can be attached to the seat pad 6P (see FIGS. 5 to 7). In this case, the contact member 30 and the backing material 20 are overlapped with each other, and then, only the edge portions thereof are sewn together to be integrated with each other (along the sewing line SEW). Then, the contact member 30 and the backing material 20 can be attached to the reverse face side of the seat pad 6P (each bank portion 6b) via an adhesive material 40 (a tape or the like) that is attached to the backing material 20.

The vehicle seat according to the invention should not be limited to the aforementioned embodiment of the invention, and various other embodiments of the invention can be adopted. For instance, in the embodiment, the example in which the bank portion 6b is pressed from outside the seat due to, for example, the occupant's action of getting on/off the vehicle has been described. Unlike this case, when the seated occupant turns around rearward, the end portion side of the seat pad that constitutes the bank portion may be about to be flexurally deformed so as to be crushed (bent) toward an outer side around the contact portion that contacts the seat frame. During this occupant's action of turning around as well, by using the configuration according to the embodiment, it is possible to appropriately avoid the situation where only the specific portion of the bank portion is flexurally deformed excessively.

In the embodiment, the configuration (the shape, the dimension, the arrangement position, the number, and the like) of each of the contact member 30 and the backing material 20 is exemplified, but the configuration of each of the contact member 30 and the backing material 20 is not limited. For example, the contact member can be provided at an appropriate position on the reverse face of the bank portion (at an inner position or an outer position in the seat), in accordance with the contact portion that contacts the seat frame (the contact portion of the contact member that contacts the seat frame). The seat frame may have an accessory member such as an airbag. However, the contact member can be disposed at a position where the contact member can contact the seat frame (a body of the seat frame or an accessory member attached to the seat frame). The contact member and the backing material can be integrated with each other according to various methods such as adhesion and fusion, as well as sewing.

In the embodiment, the basic configuration of the seat constituent members (the seat frame 6F, the seat pad 6P, and the seat cover 6S) is exemplified. However, the basic configuration of these seat constituent members can also be appropriately changed. For example, the side frame may have various shapes such as a columnar shape (hollow or solid), in addition to a flat plate shape. The seat cover can be integrated with the seat pad through adhesion. The seat cover can also be disposed without being integrated with the seat pad. That is, after the seating side of the seat pad is covered with the seat cover, an appropriate portion of the seat cover can be engaged with the seat pad or the seat frame. The backboard can be omitted if appropriate.

In the embodiment, the seat back 6 has been described as an example. However, the configuration of the embodiment is also applicable to the seat cushion 4. The embodiment is applicable to seats for vehicles in general, such as an automobile, an aircraft, and a train.

What is claimed is:

1. A vehicle seat comprising:
   a seat frame that constitutes a frame of the vehicle seat;
   a seat pad that is disposed on the seat frame and that defines an outer shape of the vehicle seat and that elastically supports an occupant;
   a planar backing material that is integrated with the seat pad and that covers a reverse face of the seat pad; and
   a planar contact member that is harder than the backing material, wherein
   the seat pad includes a main portion that allows the occupant to be seated, and a bank portion that is disposed at an outer side of the vehicle seat with respect to the main portion, and that protrudes toward a seating side,
   the main portion is disposed in the seat frame, and a reverse face side of the bank portion contacts the seat frame so as to be supported by the seat frame,
   the contact member is provided on a side of the backing material that faces the seat frame such that the contact member and the backing material are movable relative to each other, and
   the bank portion is configured to be pressed in a width direction of the vehicle seat such that an end portion side of the seat pad that constitutes the bank portion is deformed around a contact portion of the contact member that contacts the seat frame and the backing material and the seat pad including the bank portion move in a crushing direction relative to a portion of the contact member that contacts the seat frame.

2. The vehicle seat according to claim 1, wherein the contact member is defined by a material that is harder than a material that defines the backing material.

3. The vehicle seat according to claim 1, wherein the contact member has a thickness that is greater than a thickness of the backing material.

4. The vehicle seat according to claim 3, wherein
   the thickness of the contact member is 2 to 3 times greater than the thickness of the backing material, and
   the contact member and the backing material are defined by a same material.

5. The vehicle seat according to claim 1, wherein an end of the backing material is configured to move away from an end of the contact member in the crushing direction.

* * * * *